Figure 1:
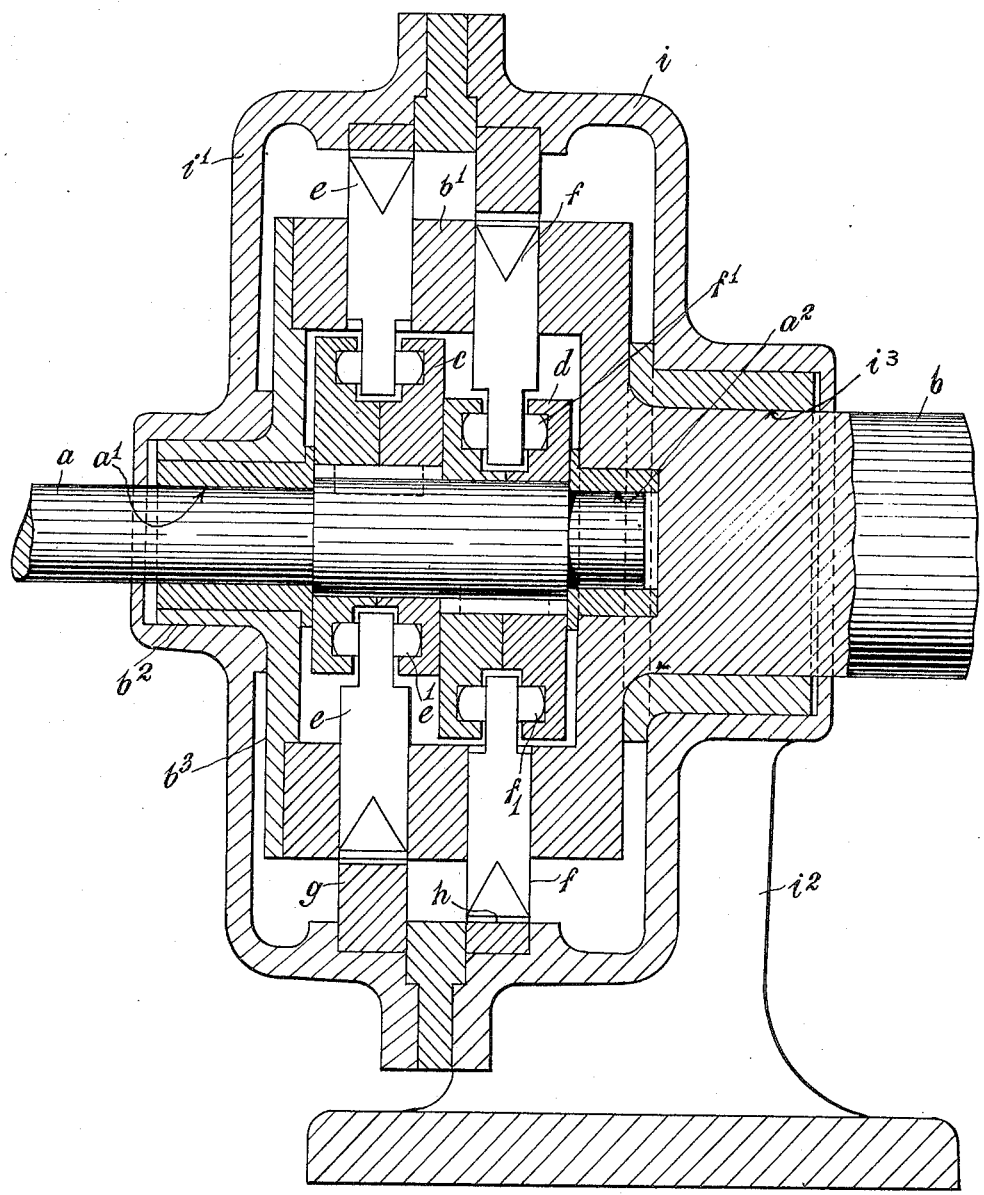

June 30, 1925.

W. C. PITTER 1,543,791

TRANSMISSION GEARING

Filed Aug. 18, 1920     4 Sheets-Sheet 4

Patented June 30, 1925.

1,543,791

UNITED STATES PATENT OFFICE.

WALTER CHARLES PITTER, OF ELTHAM, ENGLAND.

TRANSMISSION GEARING.

Application filed August 18, 1920. Serial No. 404,358.

*To all whom it may concern:*

Be it known that I, WALTER CHARLES PITTER, a subject of the King of Great Britain, and resident of Eltham, in the county of Kent, England, have invented certain new and useful Improvements in Transmission Gearing, of which the following is a specification.

This invention relates to transmission gearing and has reference to a mechanism which can be utilized as a reduction gear.

The invention consists broadly of a transmission gearing comprising a circumferentially toothed element, plungers cooperating with the teeth of said circumferentially toothed element, means for carrying and guiding said plungers so as to ensure reciprocation in a direction normal to the pitch line of the teeth of said circumferentially toothed element, and means for reciprocating said plungers relative to said teeth.

By reason of the reciprocating of the plungers once in each revolution of the driving member—that is the member driven by the prime mover—the second or driven member—that is the member from which the driving effort is transmitted—moves a distance corresponding to one or more teeth.

In carrying out this said invention according to one arrangement I mount an eccentric or cam on a central shaft. Radially disposed relative to this shaft and contained in a holder or cylindrical body, I provide plungers the outer ends of which are in the form of teeth and contact with an outer ring of teeth carried upon the inner periphery of a driven member, the action being such that, when the shaft is rotated, the eccentric or cam on the shaft forces the plungers outward into the teeth in the outer ring thereby causing said outer ring or the cage containing the plungers to rotate forwards or backwards according to the number of plungers to teeth. When the number of teeth is greater than that of the plungers, the outer ring turns in the same direction as central shaft and the reverse when the teeth are less in number than the plungers. The throw of the cam or eccentric must always be sufficient to lift the plungers completely out of the teeth of the driven member when the plungers have moved to the end of their return or inoperative stroke.

It will be readily understood that the whole process may be reversed by having the cam or eccentric on the outer ring pressing the plungers inward into a set of teeth fixed on the central shaft, thereby imparting motion to shaft.

By building these gears so that the outer or inner teeth are wide enough to take two sets of plungers and having two cams or eccentrics placed in opposition, the radial forces on the central shaft will be balanced because the thrust of the two sets of plungers will be equal and opposite.

The movement imparted to the outer or driving ring is continuous; as each plunger tooth does an equal amount of work and the second tooth is in operation before the first was finished.

Various applications of the invention are illustrated by the accompanying drawings.

Figure 2:
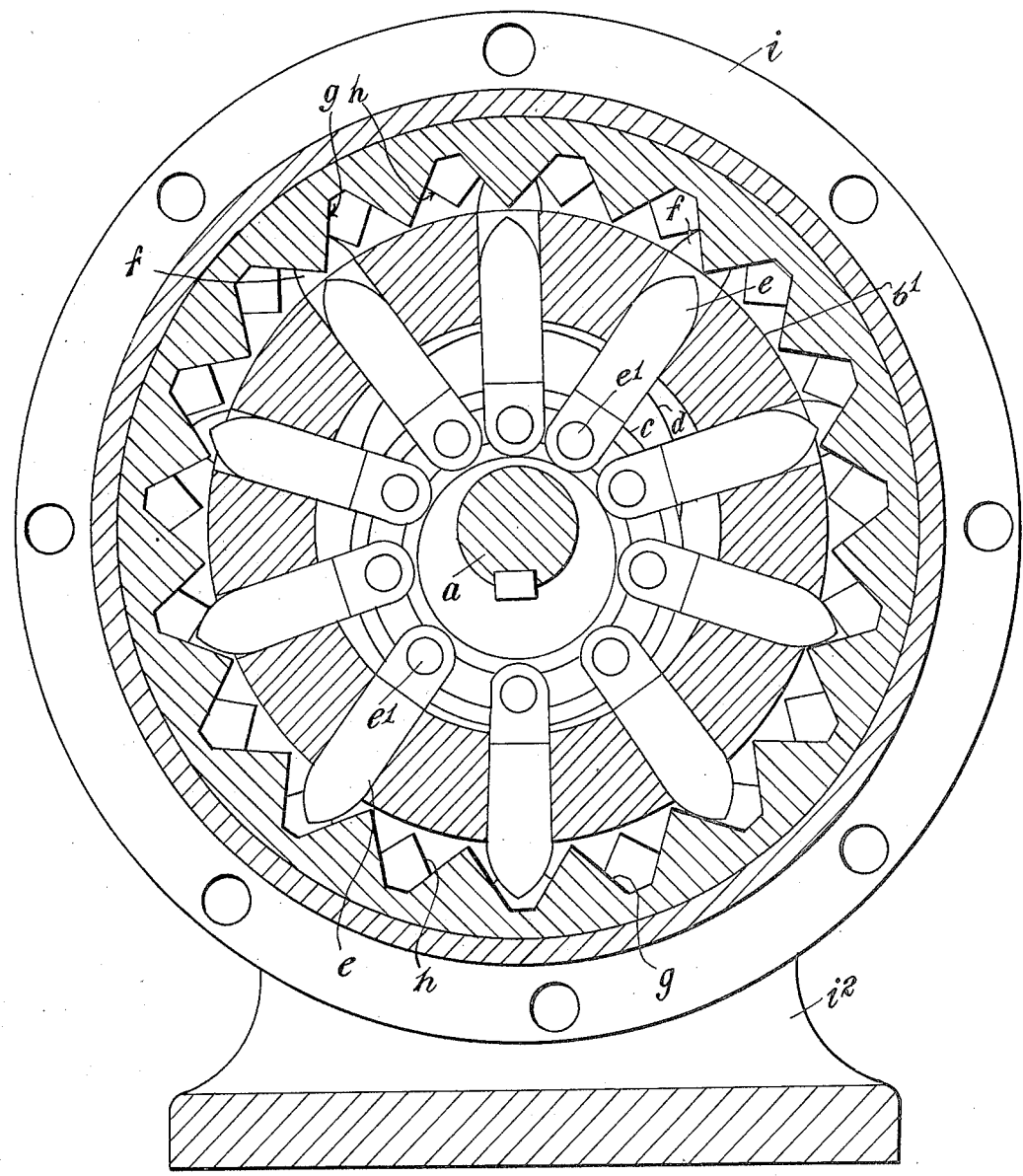

Fig. 1 is a sectional elevation through the axis, and Fig. 2 a partly sectional end view of one form of the transmission gearing using two sets of eccentrics, plungers and recessed or internally toothed rings.

In these figures $a$ is a driving or power shaft on which are keyed two oppositely disposed eccentrics $c$ and $d$.

These eccentrics are adapted to reciprocate the plungers $e$ and $f$ by means of trunnion pins $e^1$ and $f^1$ adapted to operate in grooves as shown in the said eccentrics. The plungers $e$ and $f$ reciprocate in radial holes provided in the cylindrical extension $b^1$ of the shaft $b$. $g$ and $h$ are tooth-like recessed rings secured to a casing—$i$, $i^1$, $i$ being formed integral with a standard $i^2$—adapted to be secured to any suitable fixture. In this standard is mounted a bearing $i^3$ for the shaft $b$, and in the portion or cover $i^4$ of the casing is arranged a bearing for the boss $b^2$ of a flange $b^3$ secured to the open end of the cylindrical plunger carrier $b^1$. A bearing $a^1$ is provided in the boss $b^2$ for the shaft $a$, and a bearing $a^2$ is provided in the end of the shaft $b$ for the end of the shaft $a$. The cover $i^1$ is secured to the casing $i$ by means of bolts or screws.

In operation it will be understood that the plungers e and f are reciprocated in opposite directions by means of the eccentrics c and d when the shaft a is rotated, and that the pointed ends of the plungers by engaging the inclined sides of the tooth-like recesses in the fixed rings g and h will cause their cylindrical carrier $b^1$ and the driven shaft b to rotate.

Figure 3:
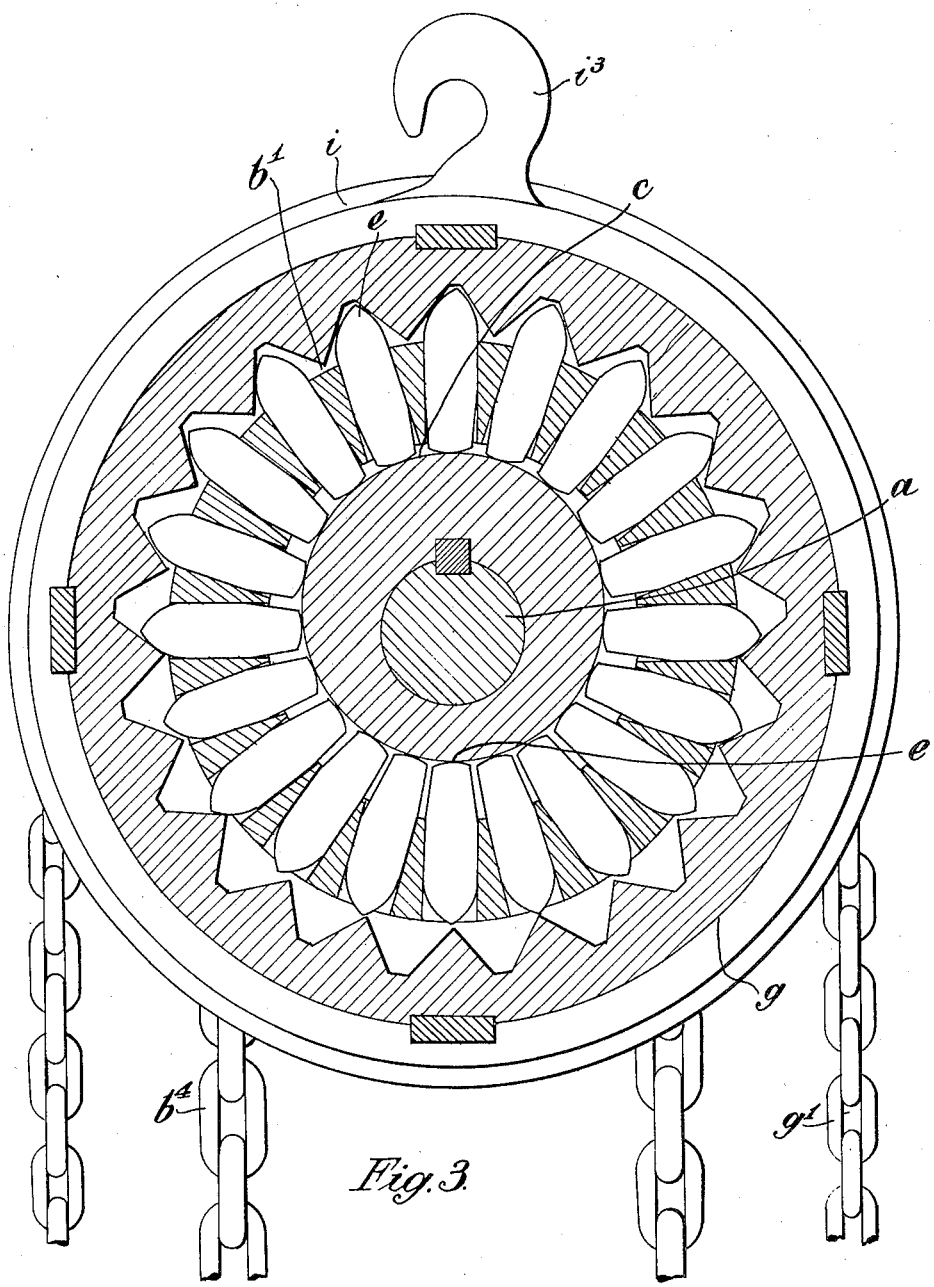

In Fig. 3, is illustrated an application of the transmission gear to chain actuated lifting mechanism. The eccentric c is keyed to the shaft a on which is also fixed a grooved pulley adapted to be rotated by the operating chain $g^1$. The toothed ring g is keyed to casing i provided with a supporting hook $i^3$. The load chain $b^4$ is adapted to be wound by a grooved pulley or drum fixed to the plunger carrying cylinder $b^1$.

Figure 4:
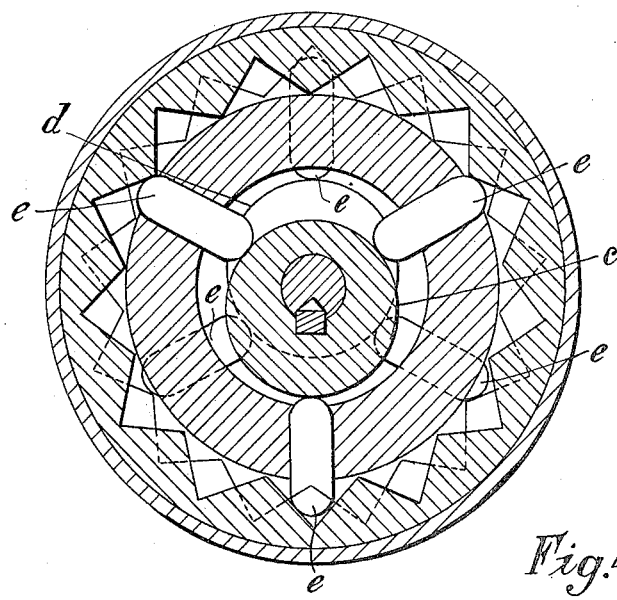

Fig. 4 is a side elevation of the relatively movable members of a transmission gearing having two sets of such members, the plungers e in each set being arranged to rest on the outer edge of the eccentrics c and d and to be held against the same by the action of the inclined sides of the recesses.

What I claim and desire to secure by Letters Patent is:—

1. A transmission gearing comprising a circumferentially toothed element, axially movable plungers having front ends cooperating with the teeth of said circumferentially toothed element, means for carrying and guiding said plungers so as to insure reciprocation in a direction normal to the pitch line of the teeth of said circumferentially toothed element, and means operating on the back ends of the plungers for reciprocating them relatively to said teeth and so that the front ends of the plungers will while sliding into the teeth force them along their pitch line.

2. A transmission gearing comprising a circumferentially toothed element, a number of reciprocating plungers having pointed ends and mounted in guideways arranged radially at equal circumferential distances apart in the rim of a hollow cylindrical element, the pointed ends of the plungers being arranged to extend from the said guideways, and a relatively rotatable cam arranged within the cylindrical element and designed to reciprocate the plungers in the guideways therein so that their pointed ends will slidingly engage in succession the sides of the respective recesses between the teeth in the circumferentially toothed element and thereby produce a relative tangential movement thereof.

3. A transmission gearing comprising a circumferentially toothed driven transmission element, a number of reciprocating plungers having pointed ends and mounted in guide ways arranged radially at equal circumferential distances apart in the rim of a hollow cylindrical element, the pointed ends of the plungers being arranged to extend from said guide ways, and a power driven rotatable cam arranged within the cylindrical element and designed to reciprocate the plungers in the guide ways therein so that their pointed ends will slidingly engage in succession the sides of the respective recesses between the teeth in the circumferentially toothed element and thereby produce a relative tangential movement thereof.

4. A transmission gearing comprising a rotary circumferentially toothed transmission element, a number of reciprocating plungers having pointed ends and mounted in guide ways arranged radially at equal circumferential distances apart in the rim of a hollow cylindrical transmission element, the pointed ends of the plungers being arranged to extend from said guide ways, and a cam arranged within the cylindrical element and designed to reciprocate the plungers in the guide ways therein so that their pointed ends will slidingly engage in succession the sides of the respective recesses between the teeth in the circumferentially toothed element and thereby produce a relative tangential movement thereof.

5. A transmission gearing comprising a non-rotary circumferentially toothed element, a number of reciprocating plungers having pointed ends and mounted in guide ways arranged radially at equal circumferential distances apart in the rim of a hollow cylindrical driven transmission element, the pointed ends of the plungers being arranged to extend from the said guide ways, and a power driven rotatable cam arranged within the cylindrical element and designed to reciprocate the plungers in the guide ways therein so that their pointed ends will slidingly engage in succession the sides of the respective recesses between the teeth in the circumferentially toothed element and thereby produce a relative tangential movement thereof.

6. A transmission gearing comprising a circumferentially toothed element in which the teeth are formed between recesses having oppositely inclined sides, a number of reciprocating plungers having pointed ends and mounted in guide ways arranged radially at equally circumferential distances apart in the rim of a hollow cylindrical element, the pointed ends of the plungers being arranged to extend from the said guide ways, and a relatively rotatable cam arranged within the cylindrical element and designed to reciprocate the plungers in the guide ways therein so that their pointed ends will slidingly engage in succession the sides of the respective recesses between the teeth in the circumferentially toothed element and thereby produce a relative tangential movement thereof.

7. A transmission gearing comprising a circumferentially toothed element, a number of reciprocating plungers having pointed ends and mounted in guide ways arranged radially at equal circumferential distances apart in the rim of a hollow cylindrical element, the pointed ends of the plungers being arranged to extend from the said guide ways, and a cam mounted on a driving power shaft arranged within the cylindrical element and designed to reciprocate the plungers in the guide ways therein so that their pointed ends will slidingly engage in succession the sides of the respective recesses between the teeth in the circumferentially toothed element and thereby produce a relative tangential movement thereof.

8. A transmission gearing comprising a circumferentially toothed element having two sets of teeth, a number of reciprocating plungers having pointed ends and mounted in guide ways arranged radially at equal circumferential distances apart in two circumferential sets in the rim of a hollow cylindrical element, the pointed ends of the plungers being arranged to extend from the said guide ways and a relatively rotatable cam element consisting of two oppositely disposed cams arranged within the cylindrical element and designed to reciprocate the plungers in the guide ways therein so that their pointed ends will slidingly engage in succession the sides of the respective recesses between the teeth in the circumferentially toothed element and thereby produce a relative tangential movement thereof.

9. A transmission gearing comprising a circumferentially toothed element, a number of reciprocating plungers having pointed ends and mounted in guide ways arranged radially at equal circumferential distances apart in the rim of a hollow cylindrical element, the pointed ends of the plungers being arranged to extend from the said guide ways, and a relatively rotatable cam provided with grooves adapted to receive the plungers and arranged within the cylindrical element and designed to reciprocate the plungers in the guide ways therein so that their pointed ends will slidingly engage in succession the sides of the respective recesses between the teeth in the circumferentially toothed element and thereby produce a relative tangential movement thereof.

10. A transmission gearing comprising a circumferentially toothed element, a number of reciprocating plungers having pointed ends and mounted in guide ways arranged radially at equal circumferential distances apart in the rim of a hollow cylindrical element, the pointed ends of the plungers being arranged to extend from the said guide ways, and a relatively rotatable cam divided centrally through the plane of the cam and having oppositely disposed grooves in the dividing faces of the cam and arranged within the cylindrical element and designed to reciprocate the plungers in the guide ways therein so that their pointed ends will slidingly engage in succession the sides of the teeth in the respective recesses between the teeth in the circumferentially toothed element and thereby produce a relative tangential movement thereof.

11. In a variable transmission, a driving member and a driven member, one at least of which has an eccentric surface, and movement transmitting means interposed between said members and adapted to be independently and radially actuated by movement of the eccentric surface to advance the other.

12. A transmission gearing comprising a plurality of plungers, a shaft, means for imparting to said plungers reciprocating movements in radial direction relative to the shaft, means presenting abutment surfaces in a direction inclined to the direction of radial movement of the plungers, and a rotatable guide for said plungers.

13. A transmission gearing comprising a shaft, a plurality of plungers, means for reciprocating said plungers relatively to the shaft, elements projecting into the path of the plungers and presenting to the same surface inclined to the radial movement thereof, and means for radially guiding said plungers, said guiding means being movable circumferentially in dependence upon the deflection imparted to the plungers by said inclined surfaces.

14. In a transmission gearing a shaft, an eccentric driven thereby, plungers actuated by said eccentric, a cylindrical element concentric to the shaft and provided with guiding openings for said plungers, the openings being arranged radially relatively to the shaft, whereby in the movement of the eccentric said plungers are reciprocated through said openings, and means presenting an inclined surface to the outer end of said plungers whereby said plungers are deflected from the radial path in which they moved prior to the encounter with the said surfaces to positively impart rotation to the cylindrical element.

15. In a transmission gearing the combination of a shaft, an eccentric mounted thereon, plungers actuated in radial direction relatively to said shaft by said eccentrics, movable guiding means for maintaining said plunger in a path radial relatively to the shaft during a portion of their movement, and abutments projecting into the path of said plungers at another portion of their movement, whereby the same are deflected from the radial path circumferentially and communicate said circumferential movement to said guiding means.

16. A transmission gearing comprising an outer circumferential toothed element, plungers, means for carrying and guiding said plungers to insure reciprocation in a direction normal to the pitch line of the teeth of said circumferentially toothed element, and means for reciprocating said plungers relative to said teeth.

17. A transmission gearing comprising a circumferentially toothed element, plungers adapted for cooperation with the sides of the teeth of said element, a rotatable carrier and guide for the plungers adapted to enforce reciprocation for a part of the path of said plungers in a direction normal to the pitch line of the teeth of the circumferentially toothed element, and an eccentric actuating said plungers to reciprocate the same.

In witness whereof I affix my signature.

WALTER CHARLES PITTER.